June 6, 1967  G. S. FARAH  3,323,572
ANTI-SKID DEVICE
Filed July 7, 1965
2 Sheets-Sheet 1
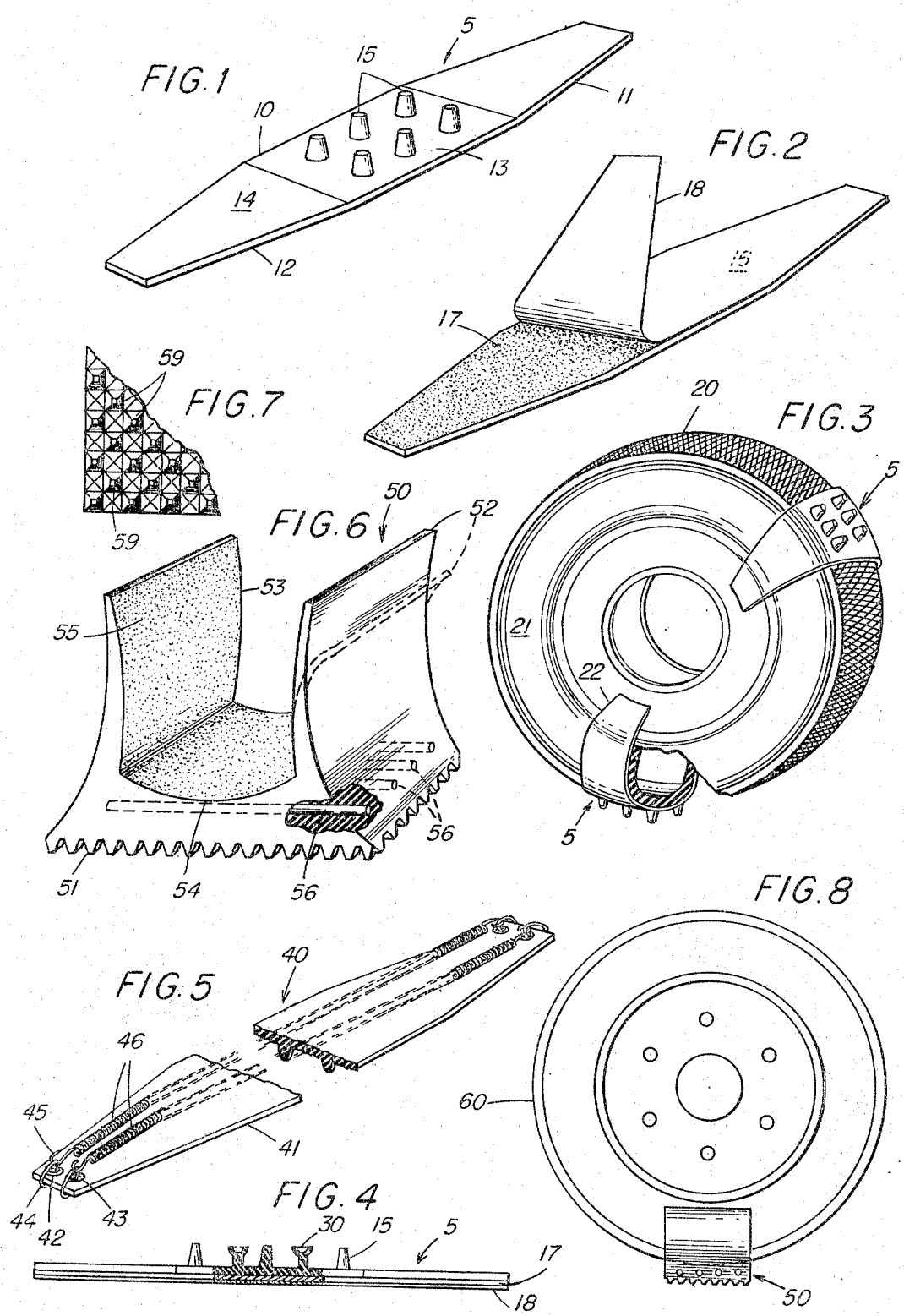

June 6, 1967  G. S. FARAH  3,323,572
ANTI-SKID DEVICE
Filed July 7, 1965  2 Sheets-Sheet 2
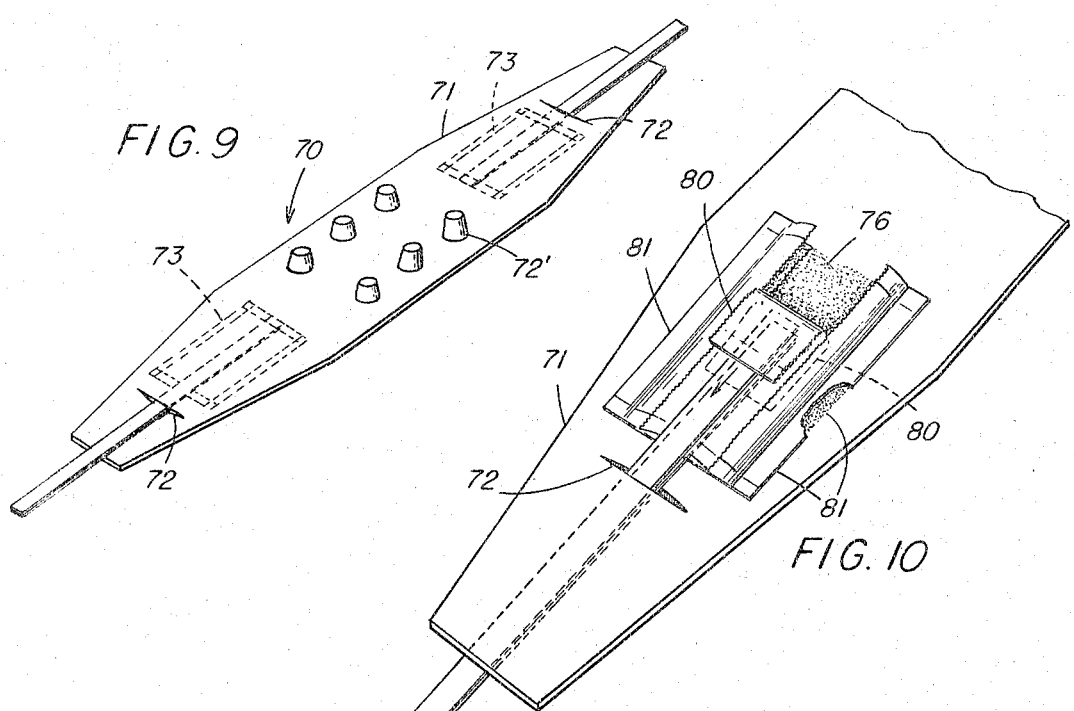
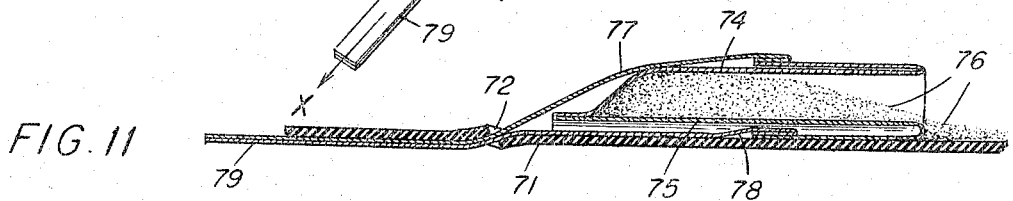
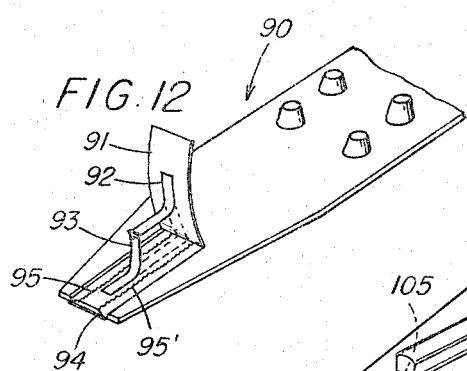
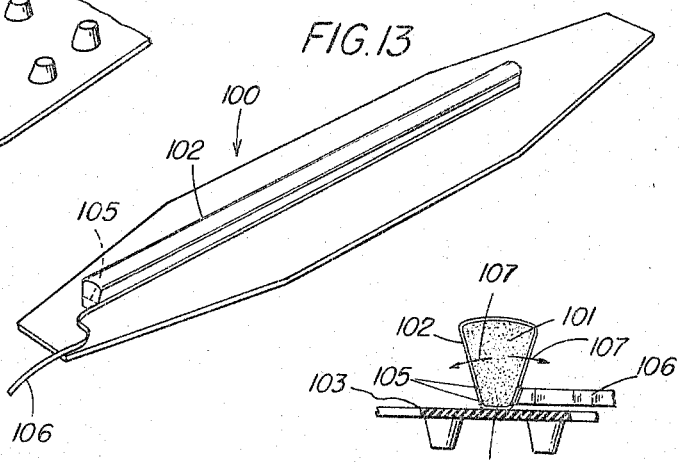

United States Patent Office 3,323,572
Patented June 6, 1967

3,323,572
ANTI-SKID DEVICE
George S. Farah, 340 E. 34th St.,
New York, N.Y. 10016
Filed July 7, 1965, Ser. No. 470,012
6 Claims. (Cl. 152—208)

This invention relates to an anti-skid device for motor vehicles and refers more particularly to a device which can be removably attached to the motor vehicle tires to increase tire traction on slippery surfaces.

A serious problem attending the operation of motor vehicles during inclement weather is the sometimes unexpected and sudden loss of tractive effort encountered in traveling over surfaces which are covered with snow, sleet, rain, etc. Similar conditions may also be encountered when traveling over sand or dirt terrain. From the standpoint of obstructing and/or delaying continued travel, the problem is obvious. Of greater consequence, however, is the question of safety, particularly when the above-mentioned conditions magnify the factors promoting loss of control of the vehicle. A most frequently encountered condition is the situation wherein the vehicle must travel in the winter time in a snowstorm or on a sleet-covered surface. To compensate for loss of tractive effort and provide for optimum safety in vehicle control under the latter conditions, it is commonplace to use either snow tires or tire chains on the driving wheels of motor vehicles. These devices are well known in the art and perform their tasks with efficiency. However, in the case where the weather condition or other factor effecting tractive conditions occur with little forewarning, as in the case of many snowstorms, it is not possible to quickly and conveniently fit the vehicle with snow tires or tire chains. For one thing, the user may not have them with him and for another, it is not an easy task to mount chains or change tires on the open road in a storm. Another consideration in the use of chains or snow tires is their expense. The user is generally required in the case of snow tires to maintain an additional set of tires with wheels, mount them at the beginning of the snow season and dismount them from the vehicle at the end of the winter. With respect to tire chains, the difficulties in mounting same on a tire are well known.

It is therefore an object of the present invention to provide an anti-skid device for a motor vehicle tire to increase the tractive effort of the tire on slippery surfaces, the device being characterized by its simplicity of construction, inexpensiveness and suitability for use on tires of various sizes.

Another object is to provide an anti-skid device for a motor vehicle tire which can be readily mounted on the tire in a minimum time and with little physical effort while on the road.

Another object is to provide an anti-skid device for a motor vehicle tire which in use is effective on snow, sleet, water or sand-covered surfaces.

A still further object is to provide an anti-skid device for a motor vehicle tire which is sufficiently compact in size to be readily and unobtrusively stowed in an automobile, as for example, in a glove compartment, under the seat or with the spare tire.

Another object is to provide, in one embodiment of this invention, an anti-skid device for a motor vehicle tire which, after it has served its purpose in providing sure traction on snowy or sleety surfaces, will wear off the tire in a very short time when the vehicle is operated on hard paved surfaces.

According to the invention, the anti-skid device may comprise an elongated body of resilient material which is provided at one side with a number of stud-like projections and on an opposite side with a protected layer of an adhesive. In use, the body is readily mounted on the tire by peeling a protective covering from the one side and pressing or molding the device against the tire so that it generally conforms to the tire shape with the projections arranged to extend radially outwardly of the tread part of the tire wheel and the ends of the body adhesively girding the tire side walls. In practice, it is preferred that a number of the anti-skid devices be mounted on each driving wheel of the vehicle, being circumferentially spaced therearound.

According to the invention, the anti-skid device may be made in various other embodiments. For example, the adhesive side of the body may be made plain, and the ends of the body be provided instead with connector means in the form of grommeted openings for receiving hooked springs which can be inserted through the wheel to hold the device in place on the tire.

In addition to the foregoing features, the stud-like projections can be given special configurations. For example, they may be in the form of truncated cones, in the form of suction cups or a combination of the two.

A further embodiment of the invention provides a supply of adhesive for connecting the anti-skid device to a tire, the adhesive being carried in an envelope secured to the device, the envelope being opened by a tear tape when it is desired to mount the device.

The invention will appear more clearly from the following detailed description when taken in conjunction with the accompanying drawing showing by way of example preferred embodiments of the inventive concept.

In the drawing:

FIGURE 1 is a perspective view of an anti-skid device constructed in accordance with the principles of the present invention, the device being intended to be adhesively connected to a motor vehicle tire.

FIGURE 2 is a perspective view of the anti-skid device shown in FIGURE 1, the device being inserted to illustrate the adhesive layer carried thereon and the paper wrapper sheet protectively overlaying the adhesive until ready for use, the wrapper sheet being shown in a partly removed condition.

FIGURE 3 is a perspective view of a motor vehicle tire illustrating the manner in which several of the anti-skid devices of FIGURES 1 and 2 are mounted thereon.

FIGURE 4 is a front elevational view, partly in section, of a slightly different embodiment of the anti-skid device wherein the stud-like projections are a combination of truncated cones and suction cups.

FIGURE 5 is a perspective view of another form of the anti-skid device of the present invention, the central portion of the device being broken away to illustrate with clarity the spring connector means which are used for connecting the device to a motor vehicle tire.

FIGURE 6 is a perspective view of still another embodiment of the anti-skid device which is intended for use on a motor vehicle tire in traversing sandy terrain.

FIGURE 7 is a partial bottom plan view of the construction shown in FIGURE 6.

FIGURE 8 is a side elevational view showing the manner in which the anti-skid device of FIGURES 6 and 7 is connected to a motor vehicle tire.

FIGURE 9 is a perspective view of another embodiment of the anti-skid device wherein the adhesive for securing the device to the tire is carried in a tear-open type envelope attached at the end of the device.

FIGURE 10 illustrates in enlarged scale one end of the device of FIGURE 9 in an inverted position showing the manner in which the envelope is torn therefrom to expose the adhesive.

FIGURE 11 is a longitudinal sectional view of FIGURE 10.

FIGURE 12 is a partial perspective of still another embodiment of the anti-skid device showing another type of tear-open envelope for holding the adhesive.

FIGURE 13 is a perspective view of still another embodiment of the anti-skid device showing another form of adhesive containing envelope mounted thereon.

FIGURE 14 is a transverse sectional view of the device of FIGURE 12.

Throughout the description, like reference numerals are used to indicate like parts in the drawing.

The anti-skid device of the present invention is of relatively simple construction, conveniently carried in a vehicle glove compartment, and is capable of being mounted on a tire in a matter of as little as one or two minutes time. Referring now in detail to FIGURES 1–3 of the drawing, the anti-skid device 5 comprises an elongated flat body 10 of a resilient material, preferably natural or synthetic rubber, although it also may be advantageously made of plastic. The body is generally flat as indicated but the inherent flexiblity of the material permits the body to be readily and easily molded to conform to the shape of the motor vehicle tire with which it is used. In particular, it is easily molded to fit against a segment of the tire treads and adjacent side walls. In practice, a body thickness of about one-eighth of an inch was found suitable for use on most tire sizes. The body 10 may be rectangular in plan shape or it may have inwardly tapering end portions as at 11 and 12 to facilitate mounting the device on a tire in the manner to be described later in detail. The central portion 13 of the body is provided on its upper or outer face 14 with one or more projecting studs 15 which may have the truncated cone shape shown or a similar shape suited for the intended purpose. In general, the studs 15 are solid members preferably molded integral with the body but having sufficient rigidity to penetrate compacted snow, sleet or other slippery surfaces over which the vehicle travels. Furthermore, the studs may be arranged in aligned or alternate offset rows, or even with a random spacing. The lower face 16 of the body which is better seen in FIGURE 2, is preferably provided with a layer of an adhesive 17, the adhesive being one which is suitable for readily penetrating the rubber surface of a motor vehicle tire tread and side wall portions to firmly connect the body thereof. The selection of the proper adhesive for the latter purposes is well within the purview of the knowledge possessed by those skilled in the art. The adhesive, of course, should be a type which is unaffected by water. The adhesive layer is covered with a protective wrapper sheet 18 as shown in FIGURE 2, the latter being coextensive with body 10. The wrapper sheet 18 is preferably a treated paper which is non-adherent to the adhesive layer but which at the same time maintains the adhesive unmarred until ready for use in connecting the device to a motor vehicle tire. The wrapper sheet 18 preferably incorporates a release agent therein and is thus adapted to be easily peeled off the body as shown in FIGURE 2 preparatory to applying the latter to a tire.

As shown in FIGURE 3, it it preferred that in practice one or more devices 5 be attached to the tire 20 of each motor vehicle driving wheel. The user upon ascertaining that driving conditions require providing additional tractive capability for each wheel, will take several of the anti-skid devices 5 and affix them to each tire 20. The first step involves removing the wrapper sheet 18 from the body, molding the body 10 to the tire shape, and then pressing the adhesive face against the tire, with each device being circumferentially spaced from another on the tire as shown in FIGURE 3. In mounting each device, the central stud carrying portion 13 thereof is placed over the tire tread portion so that the studs project radially outwardly therefrom, and the end portions of the body are located against the opposite tire side walls 21. By applying a smooth pressure against the entire surface of the body 10, all portions thereof are pressed into firm contact with the tire and the adhesive will penetrate the tire surfaces resulting in a firm bonding of the device to the tire. As was stated, the anti-skid device of the present invention is suitable for use on tires of various sizes. It is unnecessary that the central portion of body overlay exactly the tread width of the tire. It is only required that the studs be located over the tread of the tire. Furthermore, the end portions may extend beyond the tire side wall in which case, the excess can be secured to the metal wheel as at 22 or folded over on itself.

With the several devices now mounted on the tire, it will be possible for the vehicle to be driven over snowy or sleety surfaces, since the stud-like projections 15 will dig into the slippery surface and provide sufficient traction to keep the vehicle moving thereon.

With the advent of good weather, a few days of driving over hard, paved surfaces will cause the anti-skid devices to wear off at the tire tread. The remainder of the body adhered to the tire side walls can then be stripped or cut off the tire.

The stud projections on the device may be made in various embodiments according to the intended service. For example, the device in FIGURE 4 employs a combination of truncated cone shaped studs 15 and suction cup-type projections 30. The latter are particularly advantageous for use on wet pavement and provide good tire gripping action when a braking force is applied to the vehicle. As seen in FIGURE 4, the studs are preferably molded integrally with the resilient body although they may also be affixed thereto in a number of ways including adhesive means and mechanical fasteners. The device shown in FIGURE 4 is like that previously described in that it has on its lower or inner face a layer 17 of an adhesive over which is superposed a protective wrapper sheet 18.

The device 40 shown in FIGURE 5 is intended to be secured to the motor vehicle tire by a non-adhesive means. To that end, the flat body portion 41 thereof (the central stud carrying portion thereof not being illustrated for purposes of clarity) is provided adjacent each end with a number of through openings 42, the periphery of each being fitted with a grommet 43, preferably of brass or like material. A ring 44 is attached in each of the grommeted openings and provides a means to which the hooked ends 45 of several coil springs 46 may be attached. In use, the coil springs are intended to be inserted through slotted openings commonly provided in circumferential spacing around the metal wheels of motor vehicles. The springs thus hold the end portions of the flat body 41 in firm contact with the side walls of the tire similar to the manner shown in FIGURE 3.

On certain surfaces such as sandy soil or sand itself, it is desirable to increase tractive effort by increasing the bearing surface of the drive wheels. For that purpose a number of devices 50 of the type illustrated in FIGURES 6–8 may be used. The device comprises a body preferably made of natural or synthetic rubber, which is easily shaped or molded to conform to tire shape and which has a rectangular flat lower body portion 51 which curves upwardly and inwardly at the sides and merges with the relatively thinner flap-like side walls 52 and 53. The side walls 52 and 53 are flexible to facilitate conforming them to the tire shape. This may be best seen in FIGURE 6 which shows in dashed lines the position side wall 52 tends to assume when not connected to the tire. The body portion 54 at the bottom of the side walls 52 and 53 is curved as shown forming a center body portion for receiving a motor vehicle tire, the inner surfaces of the side walls and the arcuate face of the center body portion being provided with an adhesive layer 55 by means of which the device 50 can be connected with the tire 60 (FIG. 8). To enhance the rigidity and bearing character of the device, it is provided with a number of rod-like stiffeners 56 molded into the lower body portion as best seen in FIGURE 6. The lower face of the lower body portion has the contour seen in FIGURE 7, that is to say, it comprises a series of outwardly directed projections 58 with recesses or valleys 59 therebetween.

It has been found that certain adhesives in semi-paste form are particularly well suited for connecting the anti-skid device to the automobile tire. An excellent adhesive for use with rubber is DEVCON Rubber, a general purpose repair material of rubber in semi-paste form and manufactured by the Devcon Corporation of Danvers, Massachusetts. This adhesive is intended to be kept encapsulated until ready for use. To facilitate and insure the availability of the adhesive when needed, it is preferred that the adhesive be attached to the anti-skid device in an envelope, the envelope being made from metal foil or like material. The various anti-skid device embodiments illustrated in FIGURES 9–14 thus are concerned with satisfying this requirement. The envelope protectively confines the adhesive until use and adapted to be easily and quickly opened.

Referring now to FIGURES 9–11, the anti-skid device 70 illustrated therein comprises an elongated flexible body 71 which is provided with stud-like projections 72 in the same manner as described before. The body 71 adjacent each end is provided with a transverse slit as at 72′. Located adjacent each slit 72 are envelopes 73 wherein is confined a quantity of semi-paste forms adhesive. The envelopes 73 which extend longitudinally along one face of the body 71 as shown comprise upper and lower sheets 74, 75 (FIG. 11) which are sealed together around their entire peripheries to enclose a space for holding the adhesive 76. The sheets are preferably made of metal foil such as aluminum foil although other materials may also be used. The envelopes are in turn bonded along their longitudinal edges to the said one face of the device as best seen at 81 in FIG. 10. Secured to the undersheet 75 of each envelope and to the upper sheet 74 are the branches 77, 78 respectively of a tear strip 79 which is used for opening the envelope to expose the adhesive for use, the tear strips being led through the slits 72 as shown. When it is desired to apply the device to a tire, the user merely pulls on the tear strips 79 in the directions indicated by arrows X to initiate tearing away of a frangible section 80 in each envelope sheet 74, 75 as shown in FIGURES 10 and 11. The latter action removes the major parts of both envelope sheets and exposes the adhesive. The user then spreads the adhesive across the face of body 71 and applies the device to the tire in the same manner as previously described.

The device 90 shown in FIGURE 12 is similar to that illustrated in FIGURES 9 and 10 except that the flap 91 thereon extends to the edge of the device as shown. When the flap 91 is raised up, it releases the two branches 92, 93 of a tear strip from the underface of the flap 91 and the underface of the adhesive envelope 94, respectively. The tear strip branch 93 rips open the adhesive containing envelope 94 along the frangible section therein defined by the tear lines 95, 95′ to expose the adhesive in the same manner as done in the device 70. By inverting the device from the position shown in FIGURE 12, the envelope may thereafter be ripped open along its full length along the tire engaging upperface. The adhesive may thereafter be spread across the face of the device by the user and the device applied to the tire as described before.

FIGURES 13 and 14 illustrate still another embodiment 100 of the device wherein the adhesive 101 is kept confined in an elongated upstanding envelope 102 which is secured to the inner face 103 of the device as at 104. The envelope has a frangible upper body portion above the tear line 105 extending around the full periphery thereof near the bottom. By exerting a pull on the tear tape 106, the upper part of the envelope may be separated from the lower part permitting the adhesive contents thereof to fall down and spread over the upper face 103 of the device as indicated by the arrows 107. The device may then be applied to the tire in the same manner as described before.

It will be apparent from the foregoing description that the anti-skid device of the present invention is particularly advantageous for use on motor vehicle tires in adding to tractive effort for driving over slippery surfaces. It thus serves a highly important function of contributing to overall vehicle safety in operating on such surfaces.

While there are above disclosed but some embodiments of the anti-skid device of the present invention, it is possible to produce still other embodiments without departing from the scope of the inventive concept herein disclosed, and accordingly it should be understood that all matter contained in the above description or shown in the accompanying drawings should be interpreted as illustrative and not in a limiting sense.

What is claimed is:

1. An anti-skid device for a tire comprising an elongated flexible sheet having end sections and a central portion therebetween, an envelope covering one face of said sheet and secured thereto at the margins of said envelope, an adhesive confined within said envelope, said envelope having a frangible section therein adapted to be stripped away for exposing the adhesive when attaching the device to a tire, and traction elements carried by the central portion of said sheet on the other face thereof.

2. An anti-skid device for a tire comprising an elongated flexible sheet having end sections and a central portion therebetween, said sheet having a slit formed therein in each of said end sections, envelopes covering portions of said one face of said sheet adjacent each slit, said envelopes each being sealed to said face along their longitudinal margins, adhesive confined within each envelope, each envelope having frangible sections therein adapted to be stripped away for exposing the adhesive when attaching the device to a tire, tear tapes secured to the frangible sections of said envelopes for initiating stripping, said tear tapes extending through said slits, and traction elements carried by the central portion of said sheet on the other face thereof.

3. An anti-skid device for a tire comprising an elongated flexible sheet having end sections and a central portion therebetween, said sheet having a flap formed in one of said end sections, an envelope covering one face of said sheet and extending end-to-end on said sheet, said envelope having a folded under end portion overlaying said flap and extending in the direction of the other end of said sheet beyond said flap, said envelope being sealed to said face around its periphery, adhesive confined within said envelope, said envelope having a frangible section therein adapted to be stripped away for exposing the adhesive when attaching the device to a tire, a tear tape having two branches, one of said branches being secured to said flap, the other branch being secured to the folded under section of said envelope whereby lifting up the flap initiates stripping of said frangible section, and traction elements carried by the central portion of said sheet on the other face thereof.

4. An anti-skid device for a tire comprising an elongated flexible sheet having end sections and a central portion therebetween, an elongated envelope secured in upright position to one face of said sheet and extending longitudinally thereof, adhesive confined within said envelope, the upper portion of said envelope having a frangible section therein adapted to be stripped away for exposing the adhesive when attaching the device to a tire, a tear string secured to said envelope adjacent the bottom thereof and extending around the perimeter of said envelope for initiating stripping away of said frangible section, and traction elements carried by the central portion of said sheet on the other face thereof.

5. An anti-skid device for a tire comprising a body of flexible material having a relatively wide bottom portion including a central longitudinal cavity generally conforming to the tread shape of a tire, flexible upper flap-like sides integral with said bottom portion and adapted to conform to the shape of the tire side walls and cover same, the inner surfaces of said flap-like sides and said cavity having an adhesive thereon, and a plurality of reinforcing rods extending in said bottom portion.

6. An anti-skid device for a tire comprising an elongated, flexible body having end sections and a central portion therebetween, studs carried by said body and extending outwardly of one face thereof, and means for connecting the end portions of said body to the tire side walls and the central portion of the tire tread, said means comprising ring members carried at each end of said body, and springs interconnecting said ring members and the ends of said springs being releasably connected therewith.

References Cited
UNITED STATES PATENTS

| | | | |
|---|---|---|---|
| 2,498,523 | 2/1950 | Bergen | 152—222 |
| 2,571,020 | 10/1951 | Earl | 152—222 X |
| 2,632,491 | 3/1953 | Eisner | 152—222 |
| 2,946,366 | 7/1960 | Saperstein | 152—228 X |
| 2,961,026 | 11/1960 | Stanton | 152—211 |

ARTHUR L. LA POINT, *Primary Examiner.*

C. W. HAEFELE, *Examiner.*